Patented Sept. 12, 1944

2,358,046

UNITED STATES PATENT OFFICE 2,358,046

PREPARATION OF PURIFIED TOCOPHEROL SUCCINATE

James G. Baxter and Robert W. Lehman, Rochester, N. Y., assignors to Distillation Products, Inc., Rochester, N. Y., a corporation of Delaware No Drawing. Application May 20, 1941,
Serial No. 394,367

1 Claim. (Cl. 260—333)

This invention relates to improved procedure for preparing purified tocopherol and particularly to the preparation of crystalline tocopherol succinate.

Considerable work has heretofore been done on the purification of tocopherols. However, these substances, "alpha," "beta" and "gamma" are liquids and their purification in pure form has been complicated by the fact that derivatives must be prepared in order to obtain solid or crystalline forms. The allophanate ester has heretofore been the most common derivative used for this purpose. However, this material is quite possibly poisonous and has not been used for the preparation of medicinal crystalline products. McArthur "Canadian Chemistry and Process Industries," July, 1939, page 350, discloses a method of purifying tocopherol contained in wheat germ oil or in the saponification concentrate of a wheat germ oil in which the succinate ester is formed. However, the author found it necessary to convert the succinate into the allophanate for the final purification steps involving crystallization. Also De Mole, "Helvetica Chimica Acta," 22 (1939), page 65, discloses alpha tocopherol succinate but states that the succinate was an oil. In either of these references, therefore was the succinate prepared in crystalline form nor was it even indicated that the succinates were easily crystallizable substances which could be used to form easily purifiable derivatives.

This invention has for its object to provide improved procedure for preparing purified tocopherol. Another object is to provide a process for preparing tocopherol succinate in substantially pure and crystalline form. A further object is to provide a simplified process for the preparation of relatively pure crystalline tocopherol products. Another object is to improve the state of the art. Other objects will become apparent hereinafter.

These and other objects are accomplished by our invention which includes treating a tocopherol concentrate which is relatively free of sterols and like inert alcohols to convert the tocopherol content into a succinate, treating the crude succinate thus prepared to remove impurities, dissolving this partially purified succinate in a solvent and crystallizing the tocopherol succinate therefrom.

We have found that tocopherols form succinates which are crystalline and that they can be easily prepared in pure and crystalline form by this procedure. It is essential that the starting material, i. e., that which is succinated, be relatively free of sterols and other alcohol-type impurities. It should preferably contain less than 5 per cent of such materials. A very satisfactory starting material can be obtained by treating to chromatographically remove the sterols. According to this procedure the sterol content of the starting material can be greatly reduced and to an extent which will prevent sterols from giving any trouble in the later purification steps. However, satisfactory starting materials relatively free of sterols can be prepared by other procedures. For instance, if the crude starting material containing sterols is dissolved in a suitable solvent and cooled to low temperature; i. e. to 10° to −30°, the sterols are crystallized out and the mother liquor can be separated. This procedure is well known in the art, but it is to be emphasized that conventional removal of sterols by this method is satisfactory only if low temperatures are utilized for the crystallization.

The starting material should also be one which contains concentrated tocopherol. A concentration of tocopherol of 15% or more is preferred. However, concentrations of 5 per cent and even lower concentrations can be used but are not as satisfactory. The lower the concentration the greater the difficulty encountered in the subsequent purification steps, and if the concentration is materially below 5 per cent, it will be found that the crystalline succinate cannot be made.

As long as the starting materials meet the foregoing conditions, they can be derived from any source. One satisfactory source material is a molecular distillate of a vegetable oil such as corn, wheat germ, or cottonseed oils. A preferred source material is prepared from scums which collect in the barometric leg of steam deodorization plants in which vegetable oils are deodorized under vacuum. These scums contain tocopherols in relatively high concentration as compared with natural oils. The scums can be distilled or saponified to increase their tocopherol content. Such distillates or any of the saponifiable portions can be treated in accordance with our invention. Also, a satisfactory starting material can be prepared by saponification of the vegetable oils and extraction of the non-saponifiable matter which contains the tocopherol.

If the starting material contains too high a content of sterols and like impurities, we prefer to remove them by our improved chromatographic procedure. This involves dissolving the starting material in a non-eluting or non-polar solvent such as petroleum ether, "Skellysolve" or the like to form a solution which contains at least 1 per cent and preferably at least 5 per cent tocopherol. This solution is then passed through or into contact with a weak absorbent; i. e., clays, activated or not, ("Special or Super Filtrol"), kaolin, "Doucil" (a sodium aluminum silicate used for water softening), and silica gel. It is preferred that sufficient solution be passed through a body of adsorbent until the adsorbent has become substantially saturated with tocopherol which is indicated by an increase in color in the filtrate. The adsorbed tocopherol is then removed from the adsorbent by washing or eluting it with a solvent which may be noneluting with the weakest adsorbents and which may have an eluting action with the stronger adsorbents. Petroleum ether and "Skellysolve" are satisfactory eluting solvents, although benzene, ether and alcohol may be used.

This chromatographic procedure is believed to be new in and of itself, and we include it as being within the scope of our invention. While we much prefer to utilize this procedure for treatment of starting materials containing a high content of sterols or alcohol-like impurities, other procedure, such as that mentioned above, namely, crystallization from solvents at low temperature can be used.

The material containing the tocopherol is then subjected to esterification with an esterifying agent adapted to form the succinic acid half ester of tocopherol. Usual methods of esterification are used; for instance, a very satisfactory method of operation involves reacting the tocopherol with succinic acid anhydride in the presence of pyridine. The succinic acid halide may be used if desired. It is advantageous during esterification to maintain an atmosphere of inert gas such as nitrogen to prevent oxidation. The same is true with regard to all of the purification steps. However, it is not necessary, particularly if reasonable precautions are taken, to avoid prolonged exposure to air.

The succinate product is then treated to partially remove associated impurities. It is desirable first to filter the reaction mixture to remove any excess succinic anhydride if this material were used. Also the material may be dissolved in a solvent and washed with an acid to remove excess pyridine. A preferred method of partial purification is to subject the crude tocopherol succinate to an adsorption treatment. According to this procedure the crude is dissolved in a non-eluting solvent and passed through a body of adsorbent, as explained above in connection with the preliminary removal of sterols. This step should be preceded by the removal of succinic anhydride and pyridine. With most crude succinates and the preferred types of adsorbent the succinate will be found more strongly adsorbed than the accompanying impurities. These are washed out with a non- or weakly eluting solvent such as Skellysolve, then the succinate is removed by the use of a more active eluting agent such as benzene or ether.

While the adsorption described in the foregoing paragraph constitutes our preferred procedure because it removes certain dark colored impurities which crystallize with the tocopherol succinate and make it difficult to obtain a pure product, partial purification can be accomplished by other methods; for instance, if desired the crude tocopherol succinate may be dissolved in a water immiscible solvent such as ether and the ether solution may be washed first with 5% aqueous potassium or sodium carbonate followed by washing with water. The ester is not removed by the carbonate wash but is quantitatively removed as the half ester sodium salt in the water wash. By acidifying the aqueous extract and then reextracting with ether, a concentrated ester preparation is obtained.

The partially purified ester, according to any of the foregoing methods, is then dissolved in a solvent for the final crystallization step, if it is not already dissolved in a suitable solvent. Crystallization is preferably brought about by cooling the solution. A very satisfactory solvent for this step is petroleum ether. However, other low boiling hydrocarbon fractions, such as "Skellysolve" may be used. Solvents such as benzene and ether are so unsatisfactory compared to petroleum ether or "Skellysolve" that their use may be considered possible but inconvenient. Acetone, ethyl formate, and isopropyl alcohol are intermediate in utility.

EXAMPLE

*Preliminary removal of sterols by adsorption*

220 grams of tocopherol concentrate which contained 29.4% tocopherol, were dissolved in 400 cc. of "Skellysolve F" to form 40% solution of the concentrate in the solvent. The solution was passed through 1000 grams of "Special Filtrol" in an adsorption tower by pressure of nitrogen after 1500 cc. of "Skellysolve" had been run through to wet the column. The column was then washed with 2200 cc. "Skellysolve" which was enough so that the last washings from the column were colorless, indicating substantially complete removal of the tocopherol. The washings were collected in fractions of about 400 cc. during the experiment, and were assayed for tocopherols. The first fraction was nearly colorless and contained chiefly saturated esters and glycerides with little tocopherol. A second fraction then followed containing 13% of the initial tocopherol at a potency of 37% followed by the main fractions containing 84.5% of the initial tocopherol at a potency of 57.4%.

*Esterification*

350 grams of tocopherol concentrate (28.6% tocopherol) prepared by an adsorption procedure similar to that outlined above, 100 grams succinic anhydride and 400 cc. of pyridine were heated in an atmosphere of nitrogen for three hours at 80° C. This mixture was then permitted to stand over night at 5° C. The reaction mixture was filtered to remove excess succinic anhydride and the anhydride crystals thoroughly washed with ether to remove tocopherol. The resulting ether solution was washed with 5% aqueous hydrochloric acid to remove pyridine, then with water, and was finally dried and the solvent removed. The product weighed 366 grams and the yield was 87%.

*Partial purification by adsorption*

366 grams of the crude succinate prepared as described were dissolved in 2000 cc. of "Skellysolve." This solution was filtered through 2000 grams of "Special Filtrol" in a large adsorption column by nitrogen gas pressure. The column was then washed with 8 liters of "Skellysolve" followed in order by 6 liters of benzene and 11 liters of ether. From the "Skellysolve" filtrate 212 grams of inert materials, largely glycerides, were recovered. The vitamin E succinate (140 grams) was washed out in the benzene and ether fractions and was recovered by vaporization of the solvents as a dark brown oil—yield 62%.

Crystallization

The product from the adsorption was crystallized by cooling a solution thereof in ten times its volume of petroleum ether at 5° C. The crystalline product was white, in the form of needles, and melted at 74°–75.5° C. By one recrystallization the melting point was raised to that of the pure compound, namely 76–77° C. Natural alpha tocopherol half succinate has an adsorption band at 286 mu, $$E_{1\ cm.}^{1\%} = 37.0$$

Upon saponification pure natural alpha tocopherol, $$E_{1\ cm.}^{1\%} = 73.0$$

is obtained.

If a mixed tocopherol concentrate is used as a starting material, mixed tocopherol succinate crystals will be obtained. For instance, if alpha and gamma tocopherol concentrate is used as a starting material, it will be found that in the final crystallization step the alpha form seeds the gamma form so that they both crystallize together. To obtain a pure tocopherol succinate free of other tocopherols, a starting material should be used which contains only one tocopherol. The procedure is exceedingly useful for the preparation of pure crystalline single tocopherols.

What we claim is:

The process of preparing a substantially pure crystalline tocopherol product which comprises subjecting a concentrate which contains at least 15% tocopherol to chromatographic adsorption, eluting the adsorbent with a solvent without breaking up the adsorbent column, treating the tocopherol content of the eluting solvent to form tocopherol succinate, subjecting this tocopherol succinate preparation to chromatographic adsorption, eluting the adsorbent without breaking up the adsorption column and subjecting the tocopherol succinate content of the eluting solvent to crystallization from a low boiling point hydrocarbon and separating the crystals thus formed.

JAMES G. BAXTER.
ROBERT W. LEHMAN.